United States Patent
Scoggins et al.

(10) Patent No.: US 7,826,384 B2
(45) Date of Patent: Nov. 2, 2010

(54) METHOD AND APPARATUS FOR NEGOTIATING BEARER CONTROL PARAMETERS USING PROPERTY SETS

(75) Inventors: Shwu-Yan Chang Scoggins, Fremont, CA (US); Mark M. Watson, London (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 2419 days.

(21) Appl. No.: 10/275,392

(22) PCT Filed: May 4, 2001

(86) PCT No.: PCT/US01/14596

§ 371 (c)(1), (2), (4) Date: Nov. 4, 2002

(87) PCT Pub. No.: WO01/84790

PCT Pub. Date: Nov. 8, 2001

(65) Prior Publication Data

US 2003/0227908 A1 Dec. 11, 2003

Related U.S. Application Data

(60) Provisional application No. 60/201,870, filed on May 4, 2000, provisional application No. 60/217,320, filed on Jul. 7, 2000.

(51) Int. Cl.
*H04L 12/56* (2006.01)
*G06F 15/16* (2006.01)

(52) U.S. Cl. .................... 370/252; 370/389; 370/395.2; 709/227; 709/228

(58) Field of Classification Search .................. 370/400, 370/389, 252, 254, 395, 352, 395.2; 709/227, 709/228
See application file for complete search history.

(56) References Cited

U.S. PATENT DOCUMENTS

| | | | | |
|---|---|---|---|---|
| 5,339,413 A | | 8/1994 | Koval et al. .................. 395/650 |
| 5,371,534 A | * | 12/1994 | Dagdeviren et al. ....... 348/14.01 |
| 5,420,867 A | | 5/1995 | Price et al. ................ 370/110.1 |
| 5,434,913 A | * | 7/1995 | Tung et al. ............. 379/202.01 |
| 5,452,287 A | | 9/1995 | DiCecco et al. ................ 370/17 |
| 5,469,502 A | * | 11/1995 | Matsumoto .................. 379/230 |
| 5,594,721 A | | 1/1997 | Pan ............................ 370/392 |
| 5,703,880 A | * | 12/1997 | Miura ......................... 370/465 |
| 5,745,480 A | * | 4/1998 | Behtash et al. .............. 370/252 |
| 5,761,623 A | * | 6/1998 | Lupien et al. ............ 455/552.1 |

(Continued)

*Primary Examiner*—Alpus H Hsu
(74) *Attorney, Agent, or Firm*—Winthrow & Terranova, PLLC (57) ABSTRACT

Methods and apparatus for negotiating bearer control parameters using property sets. A property set is a specific set of default parameters or "properties" to be used for a given bearer channel type in an integrated node. Property set information can be passed between integrated nodes (301, 302) in a multimedia packet network (305). In many cases, a parameter negotiation can be completed quickly after the originating node sends a setup message including a list of one or more property sets and one or more requested parameters. In all cases, the bearer type and bearer parameters are determined based on capabilities of the originating and terminating nodes. The invention provides a way for existing signaling links using bearer independent call control (BICC), or session initiation protocol (SIP), or H.245, or similar protocols with a way to negotiate more bearer types and parameters without significantly increasing the bandwidth needed for the negotiation, or requiring nodes to be provisioned.

27 Claims, 9 Drawing Sheets

U.S. PATENT DOCUMENTS

| | | | |
|---|---|---|---|
| 5,805,822 A | 9/1998 | Long et al. | 395/200.62 |
| 5,826,027 A | 10/1998 | Pedersen et al. | 395/200.51 |
| 6,125,122 A | 9/2000 | Favichia et al. | 370/466 |
| 6,215,793 B1 * | 4/2001 | Gultekin et al. | 370/465 |
| 6,311,072 B1 * | 10/2001 | Barclay et al. | 455/552.1 |
| 6,832,254 B1 * | 12/2004 | Scoggins et al. | 709/227 |
| 7,093,015 B2 * | 8/2006 | Gubbi et al. | 709/225 |
| 7,251,231 B2 * | 7/2007 | Gubbi | 370/336 |
| 2001/0030968 A1 * | 10/2001 | Hallenstal et al. | 370/395 |

* cited by examiner

| PropertyID | Property Tag | Type | Value | M/R/O | SDP Equ. |
|---|---|---|---|---|---|
| Media | 1001 | Enumeration | Audio(0), Video(1), Data(2) | M | m |
| Transmission Mode | 1002 | Enumeration | Send(0), Receive(1), Send&Receive(2) Default: Send&Receive | M | a |
| Number of Channels | 1003 | Unsigned Integer | 0-255 | O | a |
| Sampling Rate | 1004 | Unsigned Integer | 0-2^32 | O | b |
| Bitrate | 1005 | Integer | (0..4294967295) Note – units of 100 bit/s | O | a |
| ACodec | 1006 | Octet String | Audio Codec Type: Reference: ITU-T Rec. Q.765 - Application transport mechanism. Non-ITU codecs are defined with the appropriate standards organization under a defined Organizational Identifier. Default: | R for IP, O for others | a |
| Samplepp | 1007 | Unsigned Integer | Maximum samples or frames per packet: 0-65535 | O | a |
| Silencesupp | 1008 | BOOLEAN | Silence Suppression: True/false | O | a |
| Encrypttype | 1009 | Octet String | Ref.: rec. H.245 | O | k |
| Encryptkey | 100A | Octet String SIZE(0..65535) | Encryption key Ref.: rec. H.235 | O | k |
| Echocanc | 100B | Enumeration | Echo Canceller: Off(0), G.165(1), G.168(2) Default: On | R | a |
| Gain | 100C | Unsigned Integer | Gain in db: 0-65535 | O | a |
| Jitterbuff | 100D | Unsigned Integer | Jitter buffer size in ms:0-65535 | O | a |
| PropDelay | 100E | Unsigned Integer | Propagation Delay: 0..65535 Maximum propagation delay in milliseconds for the bearer connection between two media gateways. The maximum delay will be dependent on the bearer technology. | O | a |
| RTPpayload | 100F | Integer | Payload type in RTP Profile for Audio and Video Conferences with Minimal Control Ref.: RFC 1890 Default: PCMU | R for IP, O for others | a |

*FIG. 9*

| PropertyID | Property Tag | Type | Value | M/R/O | SDP Equ. |
|---|---|---|---|---|---|
| IPv4 | 6001 | 32 BITS IPv4 Address | IPv4 Address: Reference: IETF RFC791 | M* | c |
| IPv6 | 6002 | 128 BITS | IPv6 Address: Reference: IETF RFC2460 | M* | c |
| Port | 6003 | Unsigned Integer | 0-65535 | M | c |
| Porttype | 6004 | Enumeration | TCP(0), UDP(1), SCTP(2), RTP(3) Note that RTP can run directly on top of IP. Default: UDP(1) | M | c |

*FIG. 10*

| PropertyID | Property Tag | Type | Value | M/R/O | SDP Equ. |
|---|---|---|---|---|---|
| DLCI | 5001 | Unsigned Integer | Data link connection id | M | c |
| CID | 5002 | Unsigned Integer | sub-channel id | O | c |
| SID/ Noiselevel | 5003 | Unsigned Integer | silence insertion descriptor | O | a |
| Primary Payload type | 5004 | Unsigned Integer | Primary Payload Type Covers FAX and codecs | O | a |

METHOD AND APPARATUS FOR NEGOTIATING BEARER CONTROL PARAMETERS USING PROPERTY SETS

CROSS REFERENCE TO RELATED APPLICATIONS

This application claims priority from co-pending, commonly assigned provisional patent applications, Ser. No. 60/201,870, entitled, "Call Bearer Control Information and Coding Schemes," filed May 4, 2000, and Ser. No. 60/217,320, entitled, "Call Bearer Control Parameters Negotiation Procedure," filed Jul. 7, 2000, both of which are incorporated herein by reference.

BACKGROUND

1. Field of the Invention

This invention is related to multimedia packet networks. Specifically, this invention relates to a mechanism to allow nodes at the ends of a bearer path within a multimedia packet network to negotiate bearer parameters based on the capabilities of each node, thus facilitating open switching interfaces and reducing the need for provisioning.

2. Description of the Problem

Evolution of the PSTN has accelerated in recent years; however, most of the PSTN still operates on circuit switched, time division multiplexed (TDM) connections. Integrated services digital network (ISDN) bearer channels often provide transport. In parallel with the PSTN, a packet based data network has evolved. This data network has largely been used for Internet traffic and data networking. Although these networks have been mostly separate until recently, the two networks are starting to merge. The merger of these networks requires that voice traffic be carried over packet networks, and further that such packet networks be able to seamlessly integrate with traditional circuit switched networks, as the two types of networks may carry different call legs of the same call.

Figure 1:
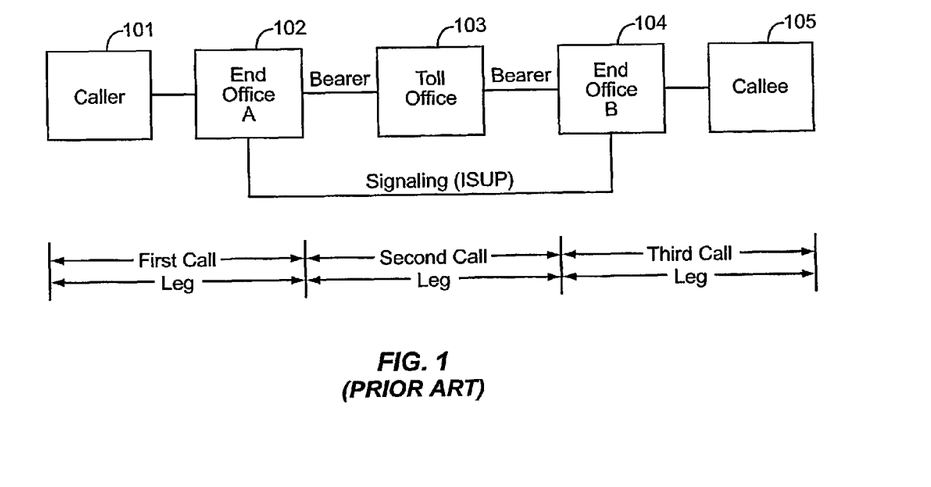
FIG. 1 conceptually illustrates a prior-art telephone connection through the public switched telephone network.

FIG. 1 illustrates a typical TDM, PSTN call. Caller 101 places a call to callee 105. The call goes through end office A, 102, over some type of trunk bearer channel to toll office 103, then to end office B, 105, and finally to the callee. Such calls may pass through multiple toll offices, or may be connected directly from one end office to another. In any case, a path of circuits for the call is maintained throughout the call. Signaling between offices is typically provided by an ISUP (ISDN user part) connection. ISUP and ISDN signaling are well understood and are standard in the telecommunications industry. For more information on ISUP signaling, see the various International Telecommunications Union (ITU) Recommendations pertaining to telephone signaling, including Q.761, Q.762, Q.763, Q.764 and Q.931, the most recent versions of which at the time of filing this application are incorporated herein by reference.

Figure 2:
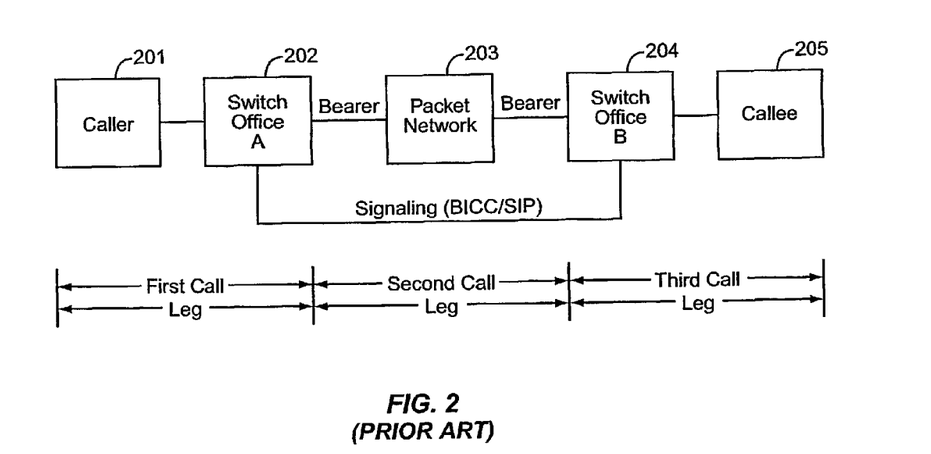
FIG. 2 conceptually illustrates a telephone connection similar to that of FIG. 1, except that one call leg goes through a packet switched network.

FIG. 2 illustrates a call that is similar to the TDM call of FIG. 1; however, in this case, the call is transported from one end office to another (called switch offices, 202 and 204, in this case) via a packet switched network 203. This fact is, in theory, transparent to caller 201 and callee 205. ISUP+, which is an extension of ISUP with extra fields for packet or cell based network information, can be used to provide signaling in this case. An International Telecommunications Union (ITU) recommendation was proposed for ISUP+ as ITU Q.1901 (BICC), which was recently published and is incorporated herein by reference. "BICC" stands for "bearer independent call control." ISUP+ and BICC are inter-changeable. Further details and capabilities of ISUP+ can be found in draft ITU-T Recommendation Q.1902, which is incorporated herein by reference.

Session Initiation Protocol (SIP) is another protocol that is also used to encapsulate ISUP and/or TCAP messages in packets to be used between two MGC based on packet networks. SIP is described in document RFC 2543, published by the Internet Engineering Task Force (IETF), March, 1999 which is incorporated herein by reference. IETF draft document draft-vemuri-sip-t-context-00.txt, known as SIP-T, uses SIP to facilitate the interconnection of the PSTN with packet networks, such as IP and ATM.

Although both BICC and SIP-T can be run over either the IP or ATM networks, practically, BICC is commonly used in the ATM networks and SIP-T is used in the IP networks.

In order for the call leg which is handled by the packet network to seamlessly connect with the call legs handled by TDM switching offices, media provided by one type of network must be converted into media provided by the other. This conversion is referred to as circuit emulation services (CES) in an ATM network. The application is referred to as voice over ATM (VtoA). In the case of an IP network, the application is referred to as voice over IP (VoIP).

The device that provides this media conversion is called a media gateway (MG). In the network of FIG. 2, a MG handles each end of the bearer connection through packet network 203. Each MG is associated with a media gateway controller (MGC). The MG can be stimulus in that it does not have call processing capabilities and is stateless. In that case, the call processing capabilities for the network reside in the MGC. An MGC provides the signaling for call control and controls the call state of a MG. The MG and MGC relationship is referred to as client-server model. Both MG and MGC are referred to as a 'node'.

There are many media gateway control protocols that can be used by the MGC to control the MG. H.248 Megaco and MGCP are two commonly used media gateway control protocols. Megaco is an application layer protocol which is also described in ITU-T Recommendation H.248, which shares a common text with the IETF standard track RFC 3015 Megaco Protocol, and which is incorporated herein by reference. Throughout the rest of this disclosure, we will refer to Megaco as "Megaco/H.248". MGCP is an IETF information track RFC 2705. A MGCP variant, Network Call Signaling (NCS), is described in ITU-T Recommendation J.160, which is only used in the cable access networks.

A MG and MGC at the end of a bearer connection form what is known as an integrated node (IN). While the media MG and the MGC were originally envisioned as specific hardware devices, they in fact can be implemented by many combinations of hardware, including multiple devices, cards within a telecommunications frame or one integrated device. Therefore, the integrated node is increasingly being treated as one system containing two logical entities. The MGC corresponds to a logical entity called the call services function (CSF) and the media gateway corresponds to a logical entity called bearer internetworking function (BIWF) in the ITU-T Recommendation Q.1950 BICC.

A MG can also be intelligent. In that case, the intelligent MG has the call processing capability. An intelligent MG does not need a MGC; instead, the intelligent MG communicates with other intelligent MG's directly. This type of MG to MG relationship is referred to as peer-to-peer model. ITU-T Recommendation H.323 IP phone is based on the peer-to-peer model. H.323 is a protocol suite, containing many protocols. Among them, H.245 specifies the call processing functions between two IP phones. The H.323 IP phone needs a Gateway to inter-work with the PSTN networks and a Gate Keeper for call authorization.

In a PSTN, the characteristics of end points (or terminations) are either homogenous or provisioned. There is no need for session establishment or bearer control parameter negotiation in that type of network. However, it is undesirable to provision integrated nodes in a packet network, since widely varying types of equipment from different suppliers may be used to form nodes. Additionally, many more factors are involved in the network connection establishment. The additional factors bring flexibility and functionality to the network; at the same time they also introduce complexity. The possible number of permutations of different factors can make the network connection establishment difficult. For example, the bearer service could be any of various categories of frame relay, asynchronous transfer mode (ATM) application layer (AAL) (AAL1, AAL2, AAL3, AAL4, and AAL5), or Internet protocol (IP) version 4 (Ipv4) or version 6 (Ipv6), or different codecs, or based on other services. Within each bearer type, there are many different possible configuration parameters and values. Ideally, the choice of bearer type and configuration parameters for a given call should be based on either user profiles, or the MG functionality; provisioning should not be required. In addition, between two MG's, many sessions can be established simultaneously. Each session can have its unique configuration. In that case, the configuration parameters for each session need to be communicated either between two MG's, or between a MG and a MGC.

The communications of session configuration parameters can be either informative or negotiable. In the case of informative, the recipient of the configuration information will either accept or reject the configuration parameters, but will not provide further negotiation function with different set of parameters value to establish the call. As a result, the call may be abandoned, even though both ends might have the capabilities to complete the call. The negotiation capability can potentially increase the chance of completing a call.

IETF RFC 2327 Session Description Protocol (SDP) provides the description for configuration parameters. SDP is based on IETF RFC 2234 ABNF syntax. SDP has been used by almost all protocols for communication between two MG's, or between two MGC's, or between a MG and a MGC. SIP, BICC, H.248, MGCP, NCS, H.323/H.245, Q.1950, and Q.1990 all use SDP for session parameter descriptions. Most of these protocols provide the informative function rather than a negotiation function. There is seldom any negotiation capability between two MG's, either directly or indirectly (such as through the MGC's). What is needed is a way to efficiently negotiate bearer channel type and parameters between two nodes within a multimedia packet network that can work with protocols that do not provide for direct negotiation. The negotiation should be based on the capabilities of each MG or MGC and should use as little bandwidth as possible on connections between nodes. The negotiation can be defined by user profiles, or by the hardware and software installed at the node.

This invention also provides session configuration negotiation in SDP. There is no limitation on how this invention can be applied with different protocols, which use SDP. Various protocols, such as SIP, BICC, H.248, MGCP, NCS, H.323/H.245, Q.1950, and Q.1990, can use this invention.

SUMMARY

The present invention solves the above problems by providing a way for existing signaling links using SIP, BICC, H.248, MGCP, NCS, H.323/H.245, Q.1950, and Q.1990, or similar protocols, to negotiate session configuration parameters without significantly increasing the bandwidth needed for connections, or requiring nodes to be provisioned. Negotiation is based on capabilities of each MG or MGC. Those capabilities can be defined by user profiles, or by the hardware and software installed at the node. The negotiation technique according to the invention relies on a concept called "property sets." A property set is a specific set of default parameters, or "properties," to be used for a session connection. A list of property sets is a list of names of property sets for specific bearer channel types that are within the capabilities of a given node. Each property set consists of parameters that a MG is capable of functioning and that the subscriber profile has defined. The property set information can be passed from a MG to a MG indirectly and transparently through its associated MGC. The property set information can also be passed between MGC's based on knowledge of their associated MG's (such as using H.248), or be independent to their associated MG's (such as using SIP). This invention is applicable to all of above cases.

Many scenarios can happen during call establishment with the session configuration parameter negotiation mechanisms in the embodiment of the invention. According to one embodiment of the invention, an originating node in a packet network sends a setup message to the terminating node. The setup message includes a list of one or more property sets and one or more requested parameters or properties for at least one property set in the list. If one of the property sets is acceptable to the terminating node, the terminating node sends a connection acceptance message specifying the selected property set. The originating node then sends a response to the acceptance message. If the selected property set is one whose parameters were received in the setup message or is otherwise known to the terminating node, the transaction is complete. In this case, the response is a connection acknowledgment message.

If the terminating node cannot connect using any property set and/or their parameter values preferred by the originating node, the terminating node will select a property set and send back the proposed parameter value in a connect negotiation message. If the terminating node knows the preferred parameters, but needs to change one or more of them, it sends a connection negotiation message that selects the property set and proposes different parameter values. In any case, if the terminating node proposes new parameters for a property set, the originating node can send a connection negotiation message to modify one or more parameter values suggested by the terminating node. The negotiation procedure can be repeated to a limited number of iterations, depending on the application protocol, which uses the SDP. When one of the nodes accepts the property set and parameter value, it sends a connection acceptance message back to the remote node. The remote node replies with an optional connection acknowledgment message.

In any case, either node can send a connection rejection message if the proposed property sets or parameters is not fully accepted by the other node. In many cases, a parameter negotiation can be completed quickly after the originating node sends the setup message including the original list of one or more property sets and one or more requested parameter values.

The actual syntax of the connection messages can differ from one protocol to another. The terms of the connection messages used here are for illustration. This invention provides additional SDP description for session configuration parameters negotiation while being independent to the application protocols, which uses the SDP.

The invention is implemented by software in combination with the hardware of the MG and possibly the MGC. The software, which implements many aspects of the present invention, can be stored on a media. The media can be magnetic such as diskette, tape or fixed disk, or optical such as a CD-ROM or a DVD-ROM. Additionally, the software can be supplied via a network. A MG is typically implemented in a switching system containing switching fabrics, a computing module, network interfaces, and other resources. The network interfaces are implemented by adapters which are connected to switching fabrics to allow access to the system from the networks. Input/output modules or adapters allow software to be loaded and various maintenance functions to be performed. All of these functions can be implemented on one or more of adapter cards, or in multiple stand-alone devices connected together. A computing module contains a processor and memory that execute the software and provide the means to control the operation of the MG and the node to implement the invention. An integrated node which implements the invention also, in one embodiment, includes a MGC function, which may be implemented by one or more adapter cards within a frame or by a type of workstation containing a bus such a personal computer interconnect (PCI) bus.

DETAILED DESCRIPTION OF ONE OR MORE EMBODIMENTS

Figure 3:
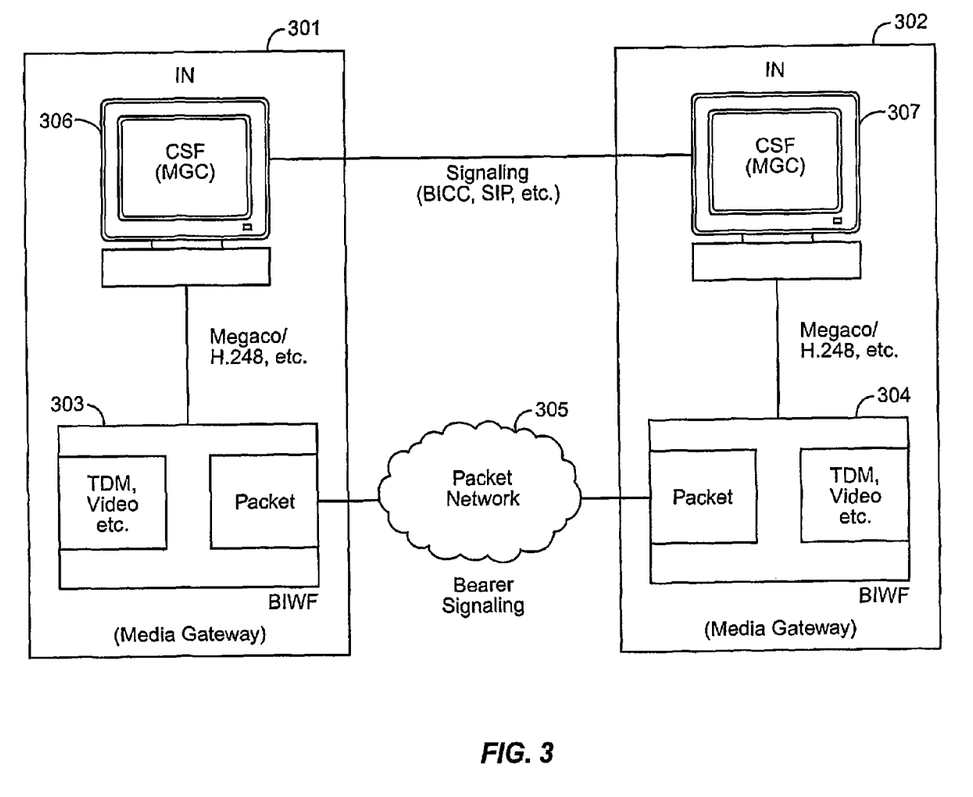
FIG. 3 is a block diagram of one network in which the present invention is used.

FIG. 3 illustrates one architecture in which the present invention can be used. According to FIG. 3, integrated node (IN) 301 is where a call originates. IN 302 is where a call terminates. Bearer internetworking function (BIWF) or Media Gateway (MG) entity 303, is the originating or ingress BIWF/MG, implemented on a media gateway platform. The terms BIWG and MG are interchangeable in this application. MG 304 is the terminating or egress MG. The MG entities of FIG. 3 convert various media such as TDM voice or video to packets which are passed on bearer channels through packet network 305. Packet networks usually use asynchronous transfer mode (ATM) or Internet Protocol (IP) for transport. We therefore refer to this network architecture as voice and telephony over ATM, or "VTOA" architecture or voice over IP (VoIP). However, the same architecture can be used with many other types of media.

Call services function (CSF) or Media Gateway Controller (MGC) entity 306 provides call server functions for MG 303, and is implemented on a media gateway controller (MGC) platform. The terms CSF and MGC are interchangeable in this application. MGC 307 provides call server functions for MG 304. By way of example, the MGC entities may communicate with each other via the call signaling protocol BICC, but are not limited to such protocol and may also communicate using SIP, or H.245. It is also possible to use a nonstandard protocol, specific to the manufacturer of the MGC and MG's, or a different standard protocol.

The communication protocol between a MGC and a MG can be of any media control protocol, such as Megaco/H.248, MGCP, NCS, etc. The connection model for the protocol describes logical entities, or objects, within the MG that can be controlled by the MGC. The model relies on extractions, mainly terminations and contexts. A termination sources and/or sinks one or more media streams. A context is an association between a collection of terminations within a MG.

In general, an "add" command is used to add terminations to contexts. A termination may be moved from one context to another with a "move" command. A termination exists in, at most, one context at a time. A non-packet termination can exist outside of a context. Property values can be set for terminations by including appropriate descriptors as parameters to the various commands in the media control protocol, such as Megaco/H.248, MGCP, and NCS. A termination in a context may have its value changed by the "modify" command. Other commands that are important to the implementation of the invention will be discussed later.

Within the Megaco protocol, session description protocol (SDP) can be used to describe bearer channel termination property values in messages passed between the CSF's and the BIWF's. SDP is described in the well-known Request for Comment (RFC) 2327, published by the Internet Engineering Task Force (IETF), April, 1998. In addition to RFC 2327, there have been also many IETF drafts with extension to RFC 2327. However, RFC 2327 and the IETF drafts with extension to RFC 2327 did not provide a negotiation procedure for bearer call control parameters. SDP uses an augmented Backus-Naur form (ABNF) description that can describe any call bearer type and parameters, once they have been defined. SDP descriptors are formatted as types and values, and their characters are case significant. SDP is a text coding scheme. In contrast to SDP, a binary coding scheme can be used by a communication protocol. The pros and cons of text coding vs. binary coding have been under debate and they are not within the scope of this invention. The negotiation methods and syntax described in this invention are based on SDP; however, they can be extended to binary and other text coding as well.

BICC currently defines addresses for BIWF's and information on CODEC's. According to the invention, a new information element is added to setup messages for property sets. In the case of forwards setup, from the ingress to the egress node, it is necessary to signal backwards which alternative had been chosen. Therefore, a selected bearer alternative container element is added to connection acceptance messages for this purpose. The egress node can reject a parameter list and end the call setup. As previously mentioned, both MGC's can be either actively involved in selection of the parameter list or just let the MG's determine the list. The information element in the setup message is repeated to specify more choices of bearer types, or property sets, in priority order, thus effectively creating a list of property sets within the setup message.

In FIG. 3, if the call bearer control parameters are negotiated between the peer MGC's, the ingress MGC 306 sends the property sets and some of the parameter list to the egress MGC 307. The egress MGC can then send a revised property set and parameter list to the ingress MGC using the Connection Negotiation message, or send a Connection Acceptance message with the selected property set without modification to the parameter list of that property set. The ingress MGC then sends the egress MGC a Connection Acceptance message, or a Connection Negotiation message, or a Connection Rejection message. Both MGC's can repeat the negotiation messages to a limited number of iterations, depending on the application protocol, which uses the SDP negotiation procedure.

If the parameter negotiation takes place between the peer MG's, a similar process is applicable by replacing MGC's with MG's, except the message can be sent back and forth through the MGC's or directly between two MG's using their bearer signaling path through the packet network 305. The ingress MG 303 sends either a list of selected parameters or an empty list to the egress MG 304. The egress MG replies with a revised parameter list that it can support. It is redundant to have both the MGC and MG administrate and modify the parameter list. However, depending on applications, the parameter list can be administrated by either the MGC, the MG, or both. Preferably, the bearer control related parameters are administrated only by the MG.

In the case that both MGC and MG are involved in parameter negotiation, there are many possible scenarios. In the first scenario, the MGC's are actively involved. A MGC chooses the property set and the parameter list and passes them to the local MG. The local MG modifies the property set and the parameter list and passes them back to the local MGC. The MGC then negotiates the property sets and the parameter list with each other.

In a second scenario, the MGC's are passively involved. A local MGC sends an empty list of property set and parameter list to the local MG. The local MG replies with the property sets and the parameter list to the MGC. The MGC then modifies the list before sending them to the remote MGC. The remote MGC sends the lists to the remote MG, which replies with the lists that it can support to the remote MGC. The remote MGC modifies the lists before sending them back to the local MGC.

FIGS. 4 through 8 illustrate the parameter negotiation procedure of the invention in signal flow diagrams. The messages are shown being transferred simply between originating or ingress nodes and terminating or egress nodes. Note that the syntax of connection messages in FIGS. 4 to 8 are for illustration. The actual syntax of the connection messages can be different from the ones listed in the FIGS. 4 to 8. Whether peer MGC's are involved in parameter negotiation or not is transparent from the outside of a node and has no effect on the overall method of the invention.

Figure 4:
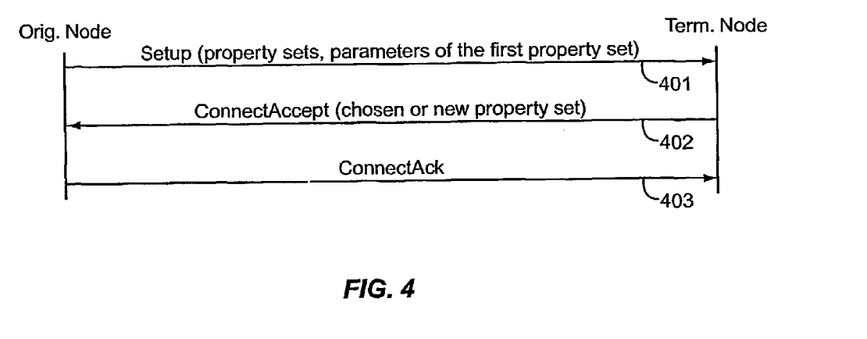
FIG. 4 is a signal flow diagram illustrating the method of the present invention.

In FIG. 4, the originating node sends a list of its property sets in order of preference to the terminating node in a setup message 401. Parameters for at least the most preferred property set are included in the message also, although parameters for more property sets from the list can be included. When the terminating node receives the property sets, it selects the property set to use based on the order of the list. For example, suppose the well-known ATM application layer 1 (AAL1) property set is the first choice of the originating node among its property sets, followed by the ATM application layer 5 (AAL5) property set, and then the frame relay property set. If the terminating node can support the AAL1 property set and the listed parameters, the terminating node will accept the AAL1 property set and send a Connection Acceptance message 402 with the name of the chosen property set. If not, it can choose the next property set in the list as a new property set, in this case, AAL5, and specify that property set in Connection Acceptance message 402. If the terminating node cannot support AAL5, it chooses frame relay in this example. If the parameters are known and no parameters need to be modified, then only the name of property set needs to be included in the Connection Acceptance message. When the originating node receives the Connection Acceptance message and the chosen property set is its first preference, then the originating node responds with a Connection Ack (acknowledgement) message, 403.

Figure 5:
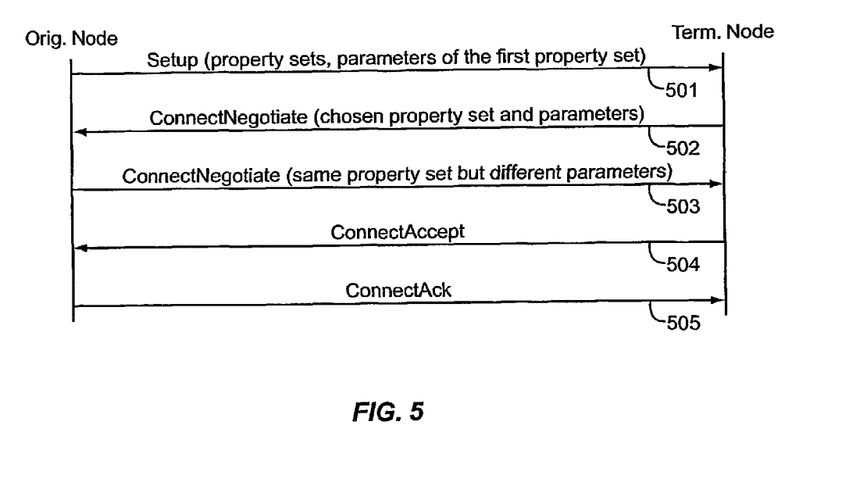
FIG. 5 is another signal flow diagram illustrating the method of the present invention.

In FIG. 5, the terminating node chooses a property set that is not the first choice of the originating node as specified in the setup message 501 and sends a set of its parameters in Connection Acceptance message 502, because no parameters for the new property set were received. The originating node will have to compare the parameters of the chosen property set with its own parameters. If there are any differences in the parameters, the originating node has to send a Connection Negotiation message 503, with new parameters for the same property set to the terminating node. If the new parameter value is acceptable to the terminating node, then the terminating node sends a Connection Acceptance message 504. The Connection Acceptance is the indication that the property set and parameter list were accepted as they are without modification. The recipient node will reply with a Connection ACK message.

Figure 6:
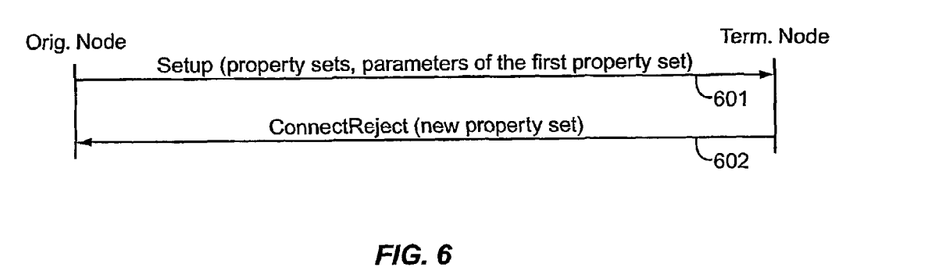
FIG. 6 is another signal flow diagram illustrating the method of the present invention.
Figure 7:
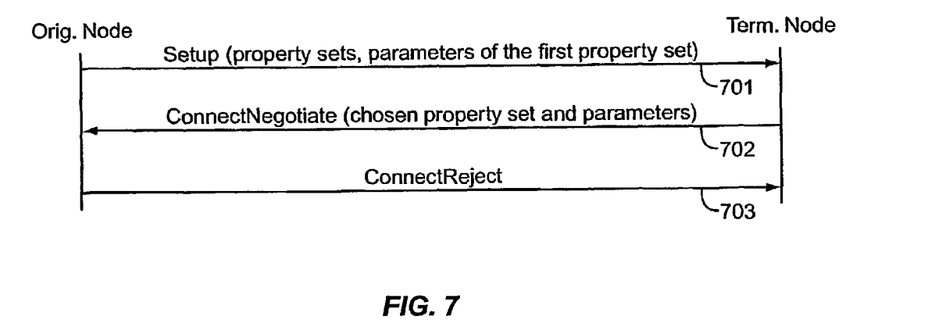
FIG. 7 is another signal flow diagram illustrating the method of the present invention.
Figure 8:
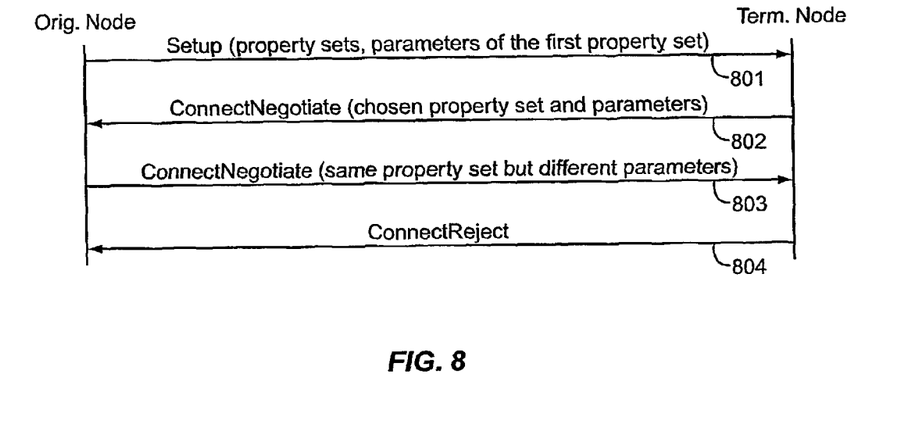
FIG. 8 is another signal flow diagram illustrating the method of the present invention.

If none of the property sets can be supported, or if there is a significant mismatch in the parameter values (such as CODEC selection), then one of the nodes responds with a Connection Rejection message to its peer at some point in the process. FIGS. 6, 7 and 8 illustrate such situations. In FIG. 6, the terminating node responds to setup message 601 with a Connection Rejection message 602. In the Connection Rejection message, the list of supported property sets is provided so that the originating node knows what is expected. In FIG. 7, after the terminating node receives setup message 701 it responds with a Connection Negotiation message 702, proposing new parameters for one of the property sets in the setup message. The originating node responds with a Connection Rejection message 703. In FIG. 8, setup message 801 includes the originating node's proposed property sets as before. The Connection Negotiation message 802 proposes a new set of parameters. The originating node attempts to modify those with a Connection Negotiation message 803, and the terminating node sends a Connection Rejection message 804.

As mentioned earlier that the syntax of the commands in the examples are for illustration. The actual syntax can be different, depending on the application protocols, which implement this invention. A Connection Response message can replace both the Connection Acceptance and Connection Negotiation messages. In the case that a Connection Response message is used, the node can compare the property sets and parameter list received with the one that it sends out.

If the receiving property sets and parameter list are a subset of the ones sent out, then the receiving message is a Connection Acceptance message. Otherwise, it is a Connection Negotiation message.

As an example, property sets to be used with the invention can be based on the bearer types described in the previously discussed H.248 recommendation and its annexes. These include a generic media property set, a mux property set, a bearer capability property set, an IP bearer property set, a transport property set, a generic ATM property set, the previously mentioned AAL property sets such as AAL1, AAL2 and AAL5, and a frame relay property set. Parameters to be negotiated in the various property sets include, but are not limited to, quality-of-service (QoS) polices, security parameters, forward or backward setup selection, frame size or jitter buffer size, CODEC type, echo cancellation status, silence suppression status, companding, and parameters related to an end-to-end call identifier.

Figure 9:
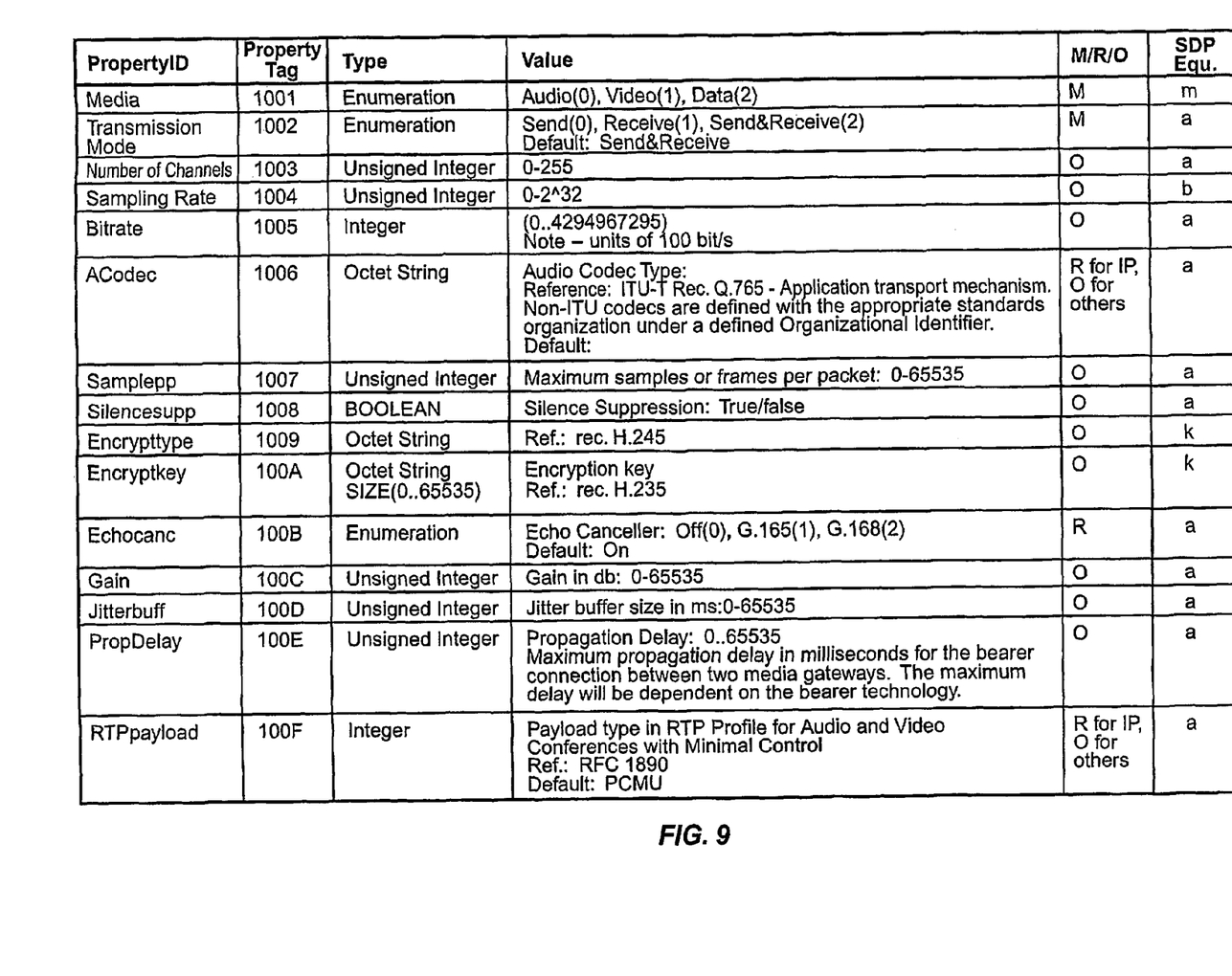
FIG. 9 is an example of a generic media property set that can be used with the invention.
Figure 10:
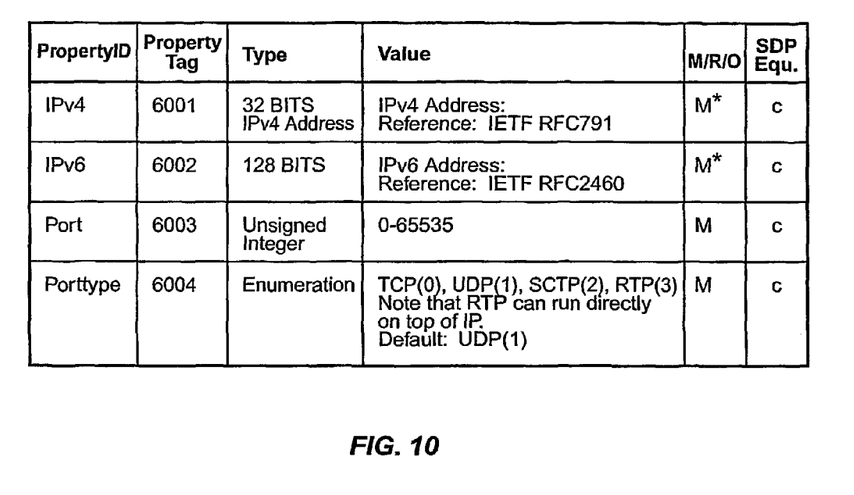
FIG. 10 is an example of an IP bearer property set that can be used with the invention.
Figure 11:
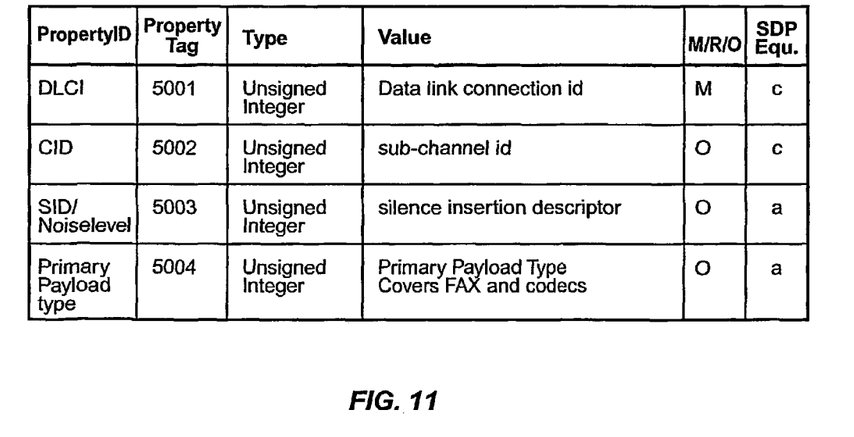
FIG. 11 is an example of a frame relay property set that can be used with the invention.

Examples of some of the simpler property sets are shown in FIGS. 9, 10, and 11. One of ordinary skill in the art can easily derive additional property sets based on the known standards discussed. In each of the figures, a PropertyID is given as the property or parameter name, and a numerical tag is given which indicates the property. The type of property and the possible values are also given. Values which use terms beginning with "H." or "Q." are referring to well-known International Telecommunication Union (ITU) recommendations. References to "IETF RFC" documents specify well-known Internet Engineering Task Force (IETF) Requests for Comments (RFC). Other acronyms are well-known and are defined in the standards. The column labeled "M/R/O" indicates whether the property is mandatory, recommended, or optional. Finally, an SDP equivalent is given for each parameter. FIG. 9 shows a generic media property set, FIG. 10 illustrates an IP bearer property set, and FIG. 11 shows a frame relay property set.

According to RFC2327, connection ('c=') information can be either in the session description section once or in the media description section once for each media stream. In one embodiment of this invention, different configuration parameters are preferably associated with different streams, therefore, the connection ('c=') information is preferably in the media description section for each property set.

According to RFC 2327, any media ('m=') and attribute ('a=') information means that all the media streams will exist simultaneously with their attribute descriptions. There is no prior known mechanism to describe different property sets as options and in preference order. Therefore, one embodiment of this invention uses a new description OPTION at the end of the media ('m=') and attribute ('a=') lines in SDP to allow for options. So, in the following example, M=audio 12345 RTP/AVP 0 OPTION
C=IN IP4 123.4.5.6 OPTION This allows optional parameters to be passed around during the negotiation stage. Without OPTION in the media ('m=') and attribute ('a=') lines, these media and attributes are required to be implemented as current RFC 2327 has specified.

The order of the media ('m=') and attribute ('a=') lines implies their preference by the sender.

For an application to implement this invention, it can follow the ABNF syntax:

Property=1* [media description]

The operator * preceding a rule element indicates repetition of [media description]. The number '1' before '*' indicates that the media description should appear at least once. If there is a number b after '*', it means the repetition is at most b times. When the number after '*' is missing, it means the repetition can be infinitive times. The square bracket '[ ]' signs mean that each media description is optional. The [media description] is based on the definition in RFC 2327.

Figure 12:
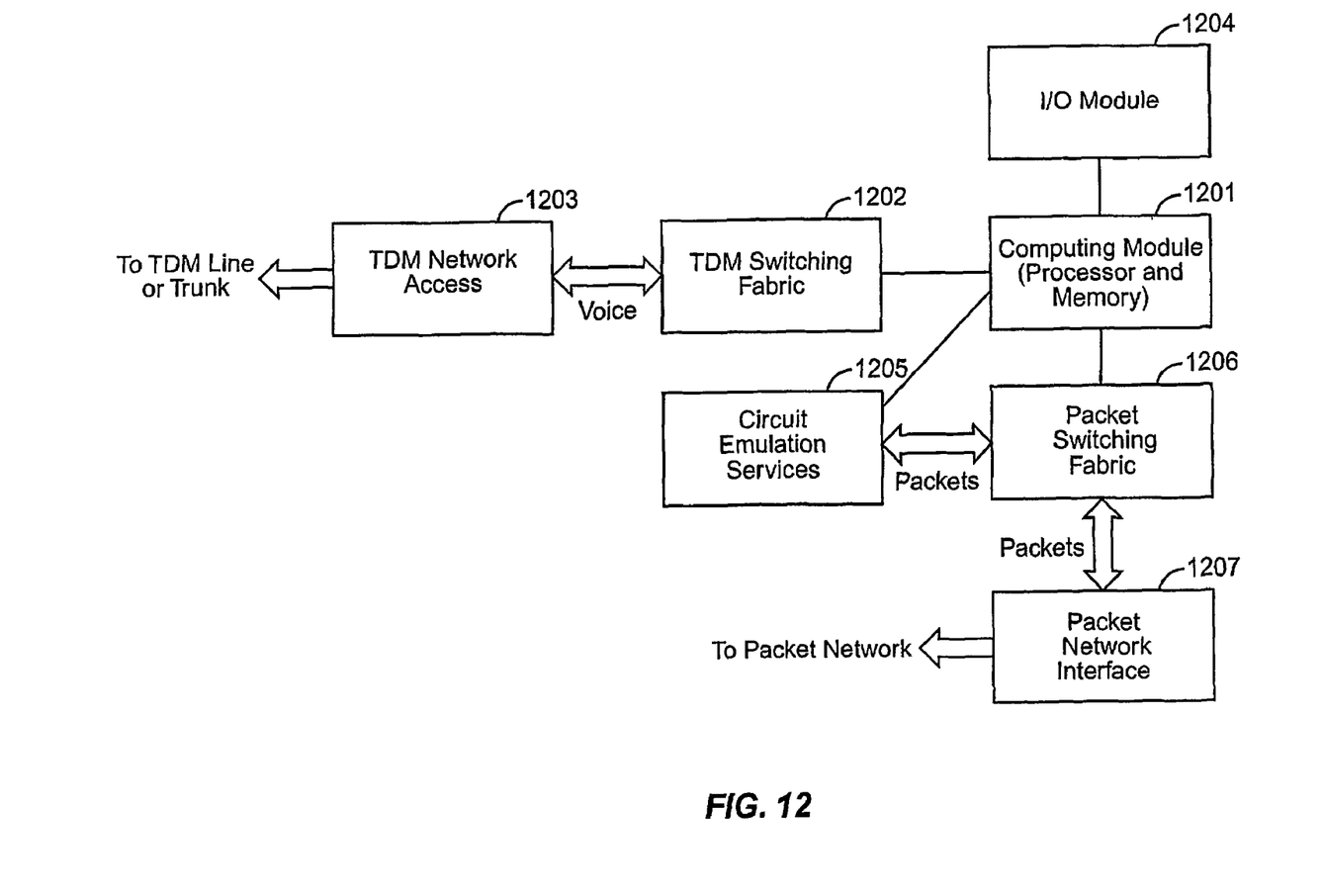
FIG. 12 is a block diagram of a media gateway that implements a bearer internetworking function entity the present invention.

FIG. 12 illustrates a conceptual, functional block diagram of a switching system, which can be used to implement a media gateway, which in turn implements a MG which is used to carry out all or part of the method of the invention. Computing module 1201 includes a central processing unit, memory, and supporting circuitry. This computing module, together with any computer program code stored in the memory, is the means for controlling the overall operation of the switching system to perform the method of the invention. TDM media conversion is shown as an example for this particular media gateway. TDM switching fabric 1202 is for switching TDM channels and is controlled by the computing module. In reality, this switching fabric may also support other media besides TDM as required. Input/output (I/O) module 1204 is also connected to the processor of computing module 1201 and includes media devices to load computer program code as well as connections for workstations or other equipment for control and maintenance of the switching system. TDM network access module 1203 serves as a TDM network interface and is connected to TDM switching fabric 1202, both of which are managed by the computing module 1201. Circuit emulation system 1205 provides circuit emulation services, converting TDM and other media to packets such as ATM cells. Packet switching fabric 1206 sends and receives packets on the packet network through packet network interface 1207.

Figure 13:
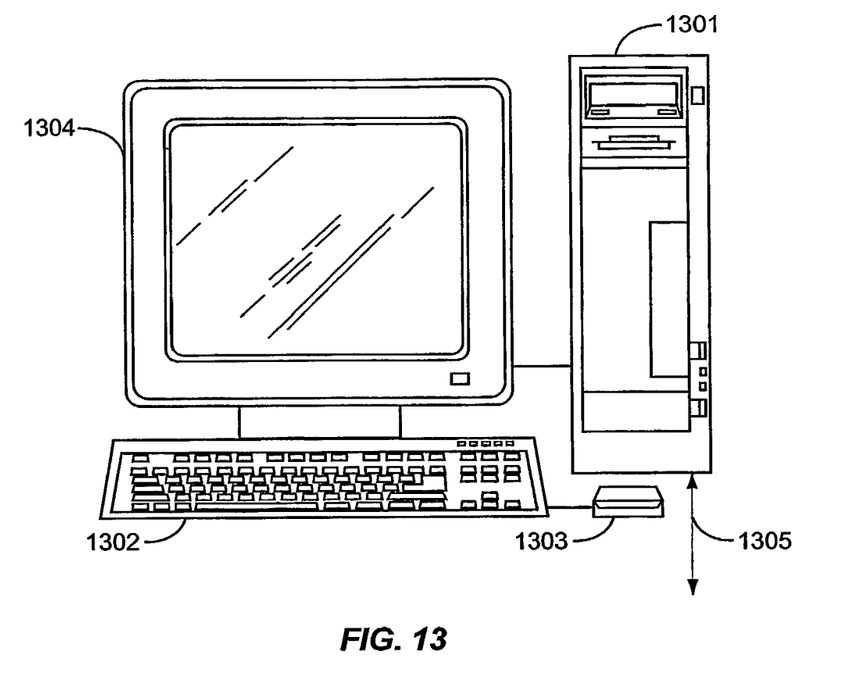
FIG. 13 is drawing of one media gateway controller that can be used to implement a call services function entity of the present invention.

FIG. 13 illustrates a workstation, which can be used to implement a media gateway controller and hence a MGC according to the present invention. I/O devices such as keyboard 1302, mouse 1303 and display 1304 are used to control the system. One or more of these devices may not be present in normal operation. System unit 1301 is connected to all devices and contains memory, media devices, and a central processing unit (CPU) all of which together form the means to implement the present invention. Network interfaces are normally implemented via adapter cards plugged into a bus, however, for the sake of simplicity they are shown graphically as interface 1305. The switching system of FIG. 12 and the workstation of FIG. 13 in this example together form an integrated node which implements the invention and is the means for carrying out the methods described herein in at least one embodiment.

According to one embodiment of the invention, appropriate computer program code in combination with appropriate hardware implements most of the elements of the present invention. This computer program code is often stored on storage media. This media can be a diskette, hard disk, CD-ROM, DVD-ROM or tape. The media can also be a memory storage device or collection of memory storage devices such as read-only memory (ROM) or random access memory (RAM). Additionally, the computer code, which in combination with appropriate hardware implements most of the elements of the present invention, can be transferred to the workstation over the Internet or some other type of network.

Figure 14:
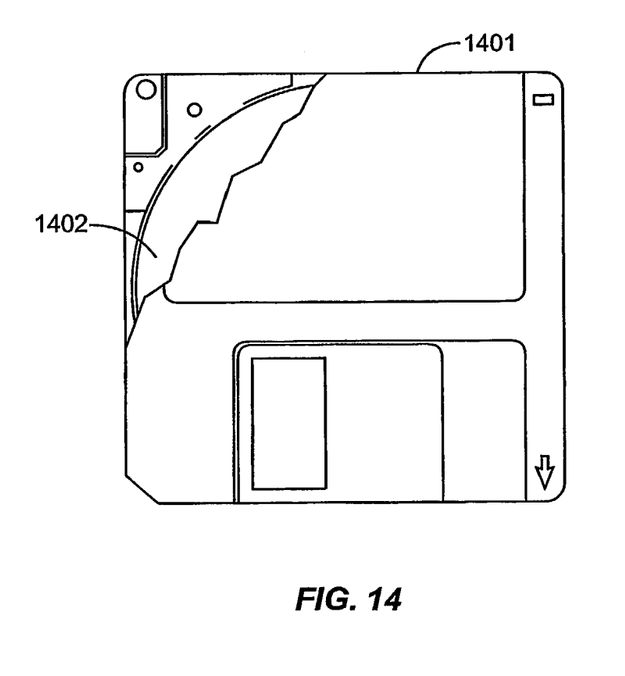
FIG. 14 shows an example of a media which stores software that implements the present invention.

FIG. 14 illustrates one example of a media. FIG. 14 shows a diskette of the type where magnetic media 1402 is enclosed in a protective jacket 1401. Magnetic field changes over the surface of the magnetic media 1402 are used to encode the computer program code. In this way the computer program code is stored for later retrieval.

This invention provides a way to negotiate network bearer channel parameters using property sets. One of ordinary skill in the networking and computing arts will quickly recognize that the invention has other applications. In fact, many embodiments and implementations are possible. The following claims are in no way intended to limit the scope of the invention to the specific embodiments described.

We claim:

1. In an originating node in a packet network, a method of negotiating bearer control parameters comprising the steps of:

sending a setup message to a terminating node, the setup message including a list of one or more property sets having a list of names of property sets for specific bearer channel types within a capability of a node and one or more requested parameters used for a session connection, where the one or more requested parameters are for at least one of the one or more property sets;

receiving an acceptance message from the terminating node specifying a selected property set and a parameter of the one or more requested parameters; and sending a response to the acceptance message to the terminating node.

2. The method of claim 1 wherein the response is a connection acknowledgement message.

3. The method of claim 1 wherein the response is a connection negotiation message including at least one modified parameter, and further comprising the step of receiving a connection acknowledgement message from the terminating node.

4. The method of claim 1 wherein the response is a connection rejection message.

5. The method of claim 1 wherein the response is a connection negotiation message including at least one modified parameter, and further comprising the step of receiving a connection rejection message from the terminating node.

6. The method of claim 1 wherein at least one of the one or more requested parameters for at least one of the one or more property sets is optional.

7. The method of claim 6 wherein there is more than one optional parameter and the optional parameters are placed in order of preference.

8. The method of claim 1 wherein the response is a connection negotiation message including at least one optional parameter and further comprising the step of receiving a connection acknowledgement message from the terminating node.

9. The method of claim 1 wherein the response is a connection negotiation message including at least one optional parameter and further comprising the step of receiving a connection rejection message from the terminating node.

10. The method of claim 1 wherein all the messages are formatted according to a bearer independent call control (BICC) protocol.

11. In a terminating node in a packet network, a method of negotiating bearer control parameters comprising the steps of:

receiving a setup message from an originating node, the setup message including a list of one or more property sets having a list of names of property sets for specific bearer channel types within a capability of a node and one or more requested parameters used for a session connection, where the one or more requested parameters are for at least one of the one or more property sets;

sending a negotiation message specifying a selected property set and a parameter to the originating node; and receiving a response to the negotiation message from the originating node.

12. The method of claim 11 wherein the response is a connection acknowledgement message.

13. The method of claim 11 wherein the response is a connection negotiation message including at least one modified parameter, and further comprising the step of sending a connection acknowledgement message to the originating node.

14. The method of claim 11 wherein the response is a connection rejection message.

15. The method of claim 14 wherein all the messages are formatted according to a bearer independent call control (BICC) protocol.

16. The method of claim 11 wherein the response is a connection negotiation message including at least one modified parameter, and further comprising the step of sending a connection rejection message to the originating node.

17. The method of claim 11 wherein at least one of the one or more requested parameters for at least one of the one or more property sets is optional.

18. The method of claim 17 wherein there is more than one optional parameter and the optional parameters are placed in order of preference.

19. The method of claim 11 wherein the response is a connection negotiation message including at least one optional parameter and further comprising the step of receiving a connection acknowledgement message from the terminating node.

20. The method of claim 11 wherein the response is a connection negotiation message including at least one optional parameter and further comprising the step of receiving a connection rejection message from the terminating node.

21. The method of claim 11 wherein all the messages are formatted according to a bearer independent call control (BICC) protocol.

22. A non-transitory computer readable medium comprising software for instructing a computer to:

send and receive setup messages, each setup message including a list of one or more property sets having a list of names of property sets for specific bearer channel types within a capability of a node and one or more requested parameters used for a session connection, where the one or more requested parameters are for at least one of the one or more property sets;

send and receive acceptance messages specifying a selected property set and a parameter;

send and receive connection negotiation messages including at least one modified parameter; and send and receive connection rejection messages.

23. An apparatus for negotiating bearer control parameters in a packet network, the apparatus comprising:

means for sending and receiving setup messages, each setup message including a list of one or more property sets having a list of names of property sets for specific bearer channel types within a capability of a node and one or more requested parameters used for a session connection, where the one or more requested parameters are for at least one of the one or more property sets;

means for sending and receiving acceptance messages specifying a selected property set and a parameter;

means for sending and receiving connection negotiation messages including at least one modified parameter; and means for sending and receiving connection rejection messages.

24. The apparatus of claim 23 wherein the apparatus is a call services function entity.

25. The apparatus of claim 23 wherein the apparatus is a bearer internetworking function entity.

26. A non-transitory computer readable medium comprising software for instructing a computer to:
send and receive setup messages, each setup message including a list of one or more property sets having a list of names of property sets for specific bearer channel types within a capability of a node and one or more requested parameters used for a session connection, where the one or more requested parameters are for at least one of the one or more property sets;
send and receive acceptance messages specifying a selected property set and a parameter without modifying the parameters;
send and receive connection negotiation messages including at least one modified parameter; and
send and receive connection rejection messages.

27. A network in which bearer parameters are negotiated over connections between call services function entities within nodes, the network comprising:
an originating node operable to send a setup message including a list of one or more property sets having a list of names of property sets for specific bearer channel types within a capability of a node and one or more requested parameters used for a session connection, where the one or more requested parameters are for at least one of the one or more property sets; and
a terminating node connected to the originating node, the terminating node operable to sending an acceptance message specifying a selected property set and a parameter to the originating node so that the bearer parameters are determined based on capabilities of the originating and terminating nodes.

* * * * *